United States Patent [19]

Nakamura

[11] Patent Number: 4,811,416

[45] Date of Patent: Mar. 7, 1989

[54] METHOD FOR READING A DOCUMENT AND A DOCUMENT READING APPARATUS UTILIZING AN IMAGE BUFFER

[75] Inventor: Yoshikathu Nakamura, Yokosuka, Japan

[73] Assignee: Kabushiki Kaisha Toshiba, Kawasaki, Japan

[21] Appl. No.: 911,438

[22] Filed: Sep. 25, 1986

[30] Foreign Application Priority Data

Sep. 27, 1985 [JP] Japan .................................. 60-21546

[51] Int. Cl.$^4$ ............................................... G06K 9/20
[52] U.S. Cl. ........................................ 382/61; 382/41; 358/280
[58] Field of Search ...................... 382/61, 41; 358/280

[56] References Cited

U.S. PATENT DOCUMENTS 4,408,181 10/1983 Nakayama ............................. 382/61
4,651,221 3/1987 Yamaguchi ........................ 358/294
4,712,139 12/1987 Kato ................................... 358/280

FOREIGN PATENT DOCUMENTS 60-20785 5/1985 Japan .

Primary Examiner—Theodore M. Blum
Attorney, Agent, or Firm—Oblon, Fisher, Spivak, McClelland & Maier

[57] ABSTRACT

In a document reading apparatus, a document is subdivided into a plurality of information fields into which character and/or image information has been recorded in accordance with predetermined format data for a document, and an imae memory has a plurality of write regions, the number of which is smaller than that of the information fields. A system control means inspects present writable regions within the image memory from which the character/image data stored has been read out, thereby permitting the document to be transported prior to the reading of the succeeding information field of the document.

10 Claims, 11 Drawing Sheets

SCANNING DIRECTION →

DOCUMENT FEED ↑

SCANNING DIRECTION →

DOCUMENT FEED ↑

FIG. 9A
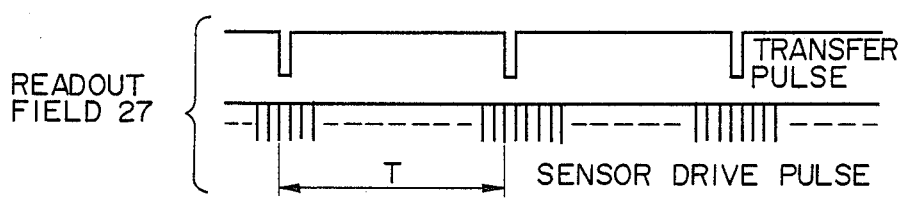
READOUT FIELD 27 { TRANSFER PULSE / SENSOR DRIVE PULSE (T)
FIG. 9B
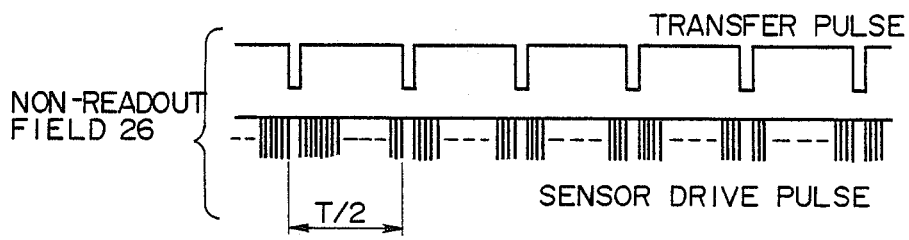
NON-READOUT FIELD 26 { TRANSFER PULSE / SENSOR DRIVE PULSE (T/2)
FIG. 10
| n | EF | RF | $Y_S$ | $Y_W$ | $X_S$ | $X_W$ | FC |
|---|----|----|-------|-------|-------|-------|-----|
| 0 | 0  | 0  |       | FFF   |       |       |     |
| 1 | 0  | 0  |       | $Y_0+Y_1$ |   |       |     |
| 2 | 0  | 1  | $Y_{S1}$ | $Y_2 (Y_{L1})$ | $X_{S1}$ | $X_{L1}$ | $FC_1$ |
| 3 | 0  | 0  |       | $Y_3$ |       |       |     |
| 4 | 1  | 1  | $Y_{S2}$ | $Y_4 (Y_{L2})$ | $X_{S2}$ | $X_{L2}$ | $FC_2$ |
| 5 |    |    |       |       |       |       |     |
FIG. 11
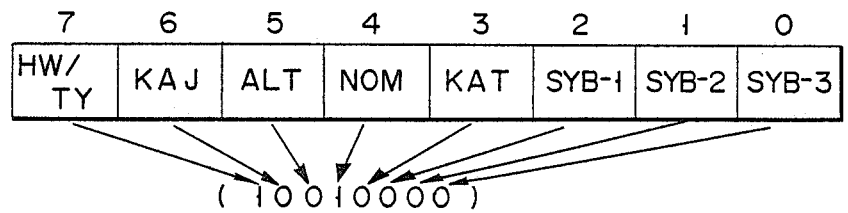
| 7 | 6 | 5 | 4 | 3 | 2 | 1 | 0 |
|---|---|---|---|---|---|---|---|
| HW/TY | KAJ | ALT | NOM | KAT | SYB-1 | SYB-2 | SYB-3 |
( 1 0 0 1 0 0 0 0 )

F I G. 16
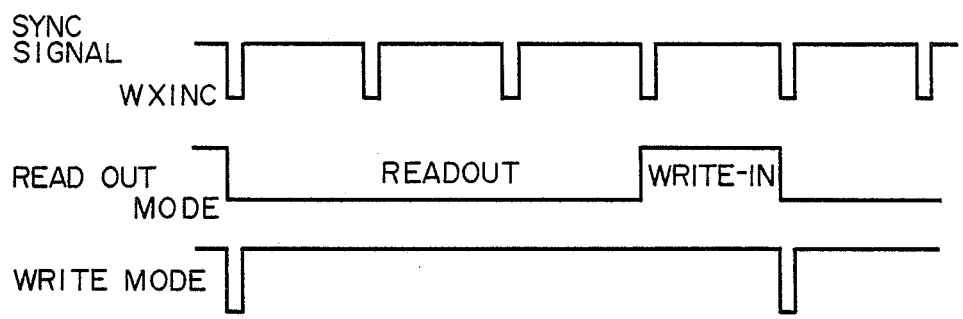
F I G. 18
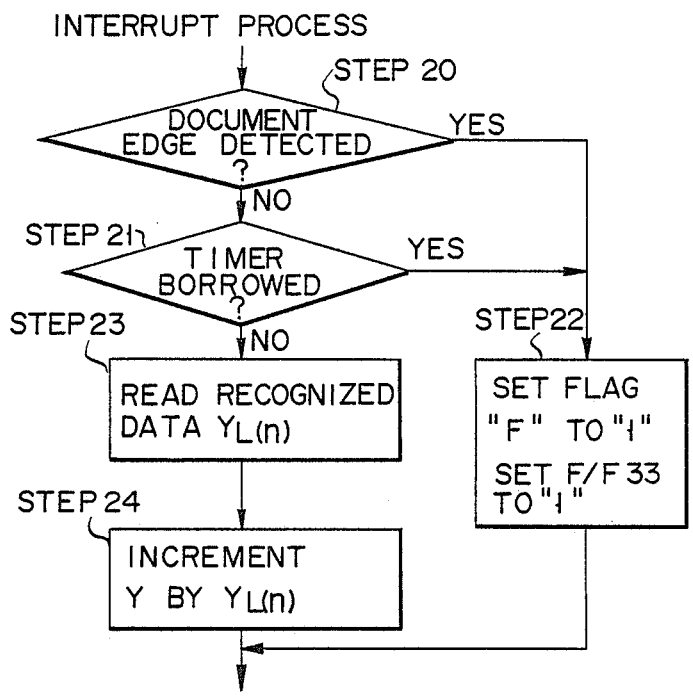

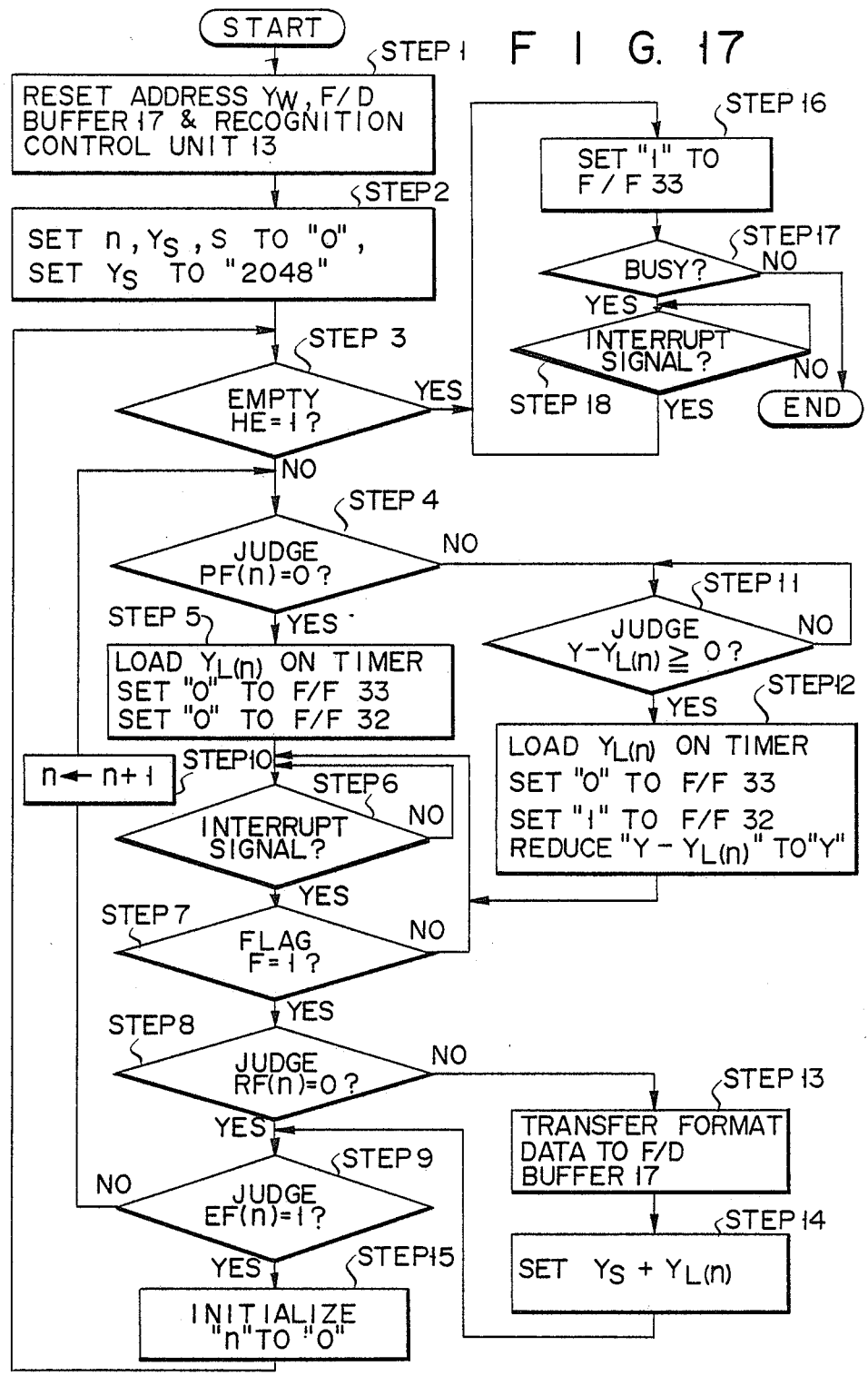

METHOD FOR READING A DOCUMENT AND A DOCUMENT READING APPARATUS UTILIZING AN IMAGE BUFFER

BACKGROUND OF THE INVENTION
1. Field of the Invention

The present invention relates to a method and a document reading apparatus capable of reading character and image information recorded on documents at a higher efficiency for image processing and recognition purposes.

2. Description of Prior Art

In recent years, a number of optical character readers (OCR) have been used as means for inputting information into electronic computers. Character subsets to be read by such a kind of OCR include not only the printed alphanumeric subset but also hand-written alphanumeric characters, hand-written KATAKANA characters, typed KANJI characters, and hand-written KANJI characters. Various kinds of character subsets are normally read in association with the development of the reading recognition technique.

The prior art optical character reading device is disclosed, for instance, in Japanese Patent Publication No. 60-20785 (1985).

As fundamentally shown in FIG. 1, in such a kind of conventional OCR, a document 1 is scanned under control of a document controller 2 and the character and image information written on document 1 is read out by a photoelectric transducer 3 and stored into an image buffer 4. The character and image information stored in image buffer 4 is read out by a recognition unit 5 and subjected to the character/image recognition on the segmentation, feature extraction, and the like of the characters and images. A reading controller 6 is also provided to control those units 2 to 5.

Image buffer 4 plays the significant role to efficiently couple the document readout scanning system with the recognition processing system.

As shown in FIG. 2, photoelectric transducer 3 (for example, a line sensor 3a is employed) photoelectrically transduces the character and image information (optically scanned through a lens 3c) on document 1 on a line by line basis at a predetermined resolution in the direction perpendicular to the conveying direction, which document 1 has been conveyed to a readout scanning position 3b of line sensor 3a by document controller 2. In this manner, the information (character strings) 1a and 1b written on document 1 are read out. Image buffer 4 is constituted by, for example, two RAMs (random access memories) 4a and 4b, connected in parallel. The information read out of document 1 in this manner is stored into respective RAMs 4a and 4b on the basis of a unit of, for instance, the character string of one line. After completion of the storage of character strings 1a and 1b each corresponding to one line, image buffer 4 communicates with recognition unit 5, thereby subjecting the information of character strings 1a and 1b to the recognition processes containing the segmentation, feature-extraction, discrimination and identification, and the like of the characters.

From a viewpoint of processing efficiency, it is very disadvantageous that during the time interval when image buffer 4 communicates with recognition unit 5, the writing operation of the character and image information into image buffer 4 is interrupted. Namely, when scanning of document 1 is interrupted, the scanned information data is potentially damaged, or lost.

Therefore, as mentioned above, RAMs 4a and 4b constituting image buffer 4 are operated in a parallel structure, thereby allowing the writing operation by the readout of the document and the reading operation for the recognition process to be alternately executed in parallel.

On the other hand, requirements to improve the reading performance for such kinds of OCR are even-increasing. For example, these requirements include not only an increase in character categories to be read out, but also an increase in the degree of freedom in writing hand-written characters (namely, a degree of freedom in modification of character styles), liberalization of the document formats, realization of a high data processing speed and the like. However, the conventional OCR as described above has the following problems.

First it is apparent that the time for requiring recognition of the character and image information stored in image buffer 4 varies considerably, depending on the character categories. That is to say, the printed alphanumeric characters and printed KATAKANA characters can be relatively simply recognized at a higher speed; conversely, in the case of the hand-written KANJI characters, a long time is required for the recognition process, since the character pattern structure is complicated, as well as there are many character subsets and similar characters.

Such a fact can be seen by example of the document shown in FIG. 3. In this case, document 1 contains character strings having different character subsets, namely, KATAKANA characters, HIRAGANA characters, KANJI characters, numerals, Roman characters, and a map. These characters are sequentially arranged in accordance with the scanning order perpendicular to the scanning direction and are scanned at a constant speed. As a result, the recognition time of the character and image information is necessarily prolonged as compared with the reading time. In this case, even if RAMs 4a and 4b of image buffer 4 shown in FIGS. 1 and 2 are parallel-connected, the readout operation of document 1 must be temporarily interrupted. This is because no further readout data can be stored in both RAMs 4a and 4b, resulting in a lower processing efficiency.

Moreover, as shown in FIG. 3, if a step 1c exists between the lines of the character strings (KATAKANA and HIRAGANA characters), these characters cannot be alternately written into two RAMs 4a and 4b in such a manner that the character string of each line is separately written as a unit. In such a case, for example, there is another disadvantage such that the simultaneous write control is required for both image buffer RAMs 4a and 4b. On the other hand, in order to simultaneously write the character information into image buffer RAMs 4a and 4b, there is also another problem that the scan of document 1 needs to be interrupted until the recognition process for the character and image information stored in RAMs 4a and 4b is completed.

Secondly, if the character strings are formated in the same direction as the document feed direction of document 1 as shown in, FIG. 4, the foregoing readout control cannot be applied thereto. In general, the buffer memory capacity of image buffer 4 is designed such that the information of the character string written in one line can be sufficiently stored with a desired accuracy necessary for the recognition process. However, when document 1 is fed with a skew in the document feed direction, the readout area of the character and image information of one line is out of the image buffer size, so that all information of the character string of one line cannot be stored.

To prevent such a problem, according to the conventional OCR, an amount of skew is detected in advance by the edge portion of document 1 to be conveyed. If the skew amount exceeds a predetermined value, the transportation of this document is regarded as an error and thus an instruction is given to the operator to re-enter the document into the OCR. However, the execution of such measures impedes the processing efficiency when continuously reading a large quantity of documents.

Thirdly, as a method of continuously processing a plurality of documents 1, the document convey paths are switched in accordance with the result of the recognition, and documents 1 are sorted and collected. In general, to switch over the document convey paths, documents 1 are continuously conveyed with a predetermined time interval between the successive documents to be continuously fed. This document feed time interval is not negligible, compared with the length of document 1.

In the prior art OCR, the period of time required to convey document 1 by the distance of the sum of the length of document 1 and the document feed interval may be set as the processing unit time for a single document (namely, the time longer than the unit time necessary to process only one document). In spite of such compromise, in the conventional OCR, image buffer 4 is controlled as mentioned above. Therefore, the time which can be allocated for the recognition process must be defined by the time necessary to scan document 1. Thus, the defined processing unit time cannot be effectively used, resulting in a long idle time.

As described above, the conventional OCR has various problems that hinder improvement of the document reading and recognition efficiencies.

To solve such drawbacks, one solution has been proposed that instead of performing the line-to-line recognition control by line buffer RAMs 4a and 4b, a page buffer memory having a capacity sufficiently to cover the entire document size, is employed.

However, when all of the information contained in the document is written into such a page buffer memory, there is another problem that not only the slow reading scan is necessarily required, but also very complicated processes need to be executed to segment the desired character strings from the information. Accordingly, a high-speed process cannot be expected.

The above-described problems of the conventional OCR will now be summarized as follows.

First, it is obvious that the image buffer memory in this kind of OCR has the significant function as a buffer for matching the scanning unit (2, 3) with the recognition unit (5).

In the OCR employing two line buffer memories alternately operable in parallel, the time required for the information recognition is greatly affected by the influences of the degree of freedom in the writing operation, as well as the document format, and skew.

Conversely, the above problems may be solved to some extent by use of the image buffer memory having capacity sufficient to cover a document of the maximum size. However, another drawback then occurs. All of the unnecessary information written on the document must be scanned and stored while at the same time, the necessary information needs to be segmented from the entire information. As a result, the whole processing time is prolonged and a high-speed reading process cannot be expected.

Therefore, there is a need for an optical character reader with a relatively small capacity buffer memory that can execute, with the high performance, for example, the recognition of hand-written KANJI characters under a constant document feed, as can be realized by only the conventional high-performance OCR.

The present invention is made in consideration of such circumstances and an object of the invention is to provide an apparatus for reading characters and images in which the degree of freedom in design of the document format can be improved, the fluctuation in recognition processing time for various kinds of character categories can be absorbed, and the document can be efficiently processed at a high speed.

More specifically, another object of the invention is to provide a document reading apparatus by which a plurality of documents can be continuously fed during the reading process at a substantially constant feeding speed, even if these documents contain hand-written characters and/or images that take much time for recognition.

Still another object of the invention is to provide a document reading apparatus which employs simple recognition arrangements, even if a plurality of documents are substantially constantly fed in the reading process, because the image memory operable under the scroll control can function as a buffer or damper memory.

SUMMARY OF THE INVENTION

The above and other objects of the invention can be realized by providing a document reading apparatus comprising:

means for transporting a document subdivided into a plurality of information fields into which character and/or image information has been recorded in accordance with predetermined format data for the document;

reading means for reading the character and/or image information from the predetermined information fields of the document to derive character/image data while the document is transported by the transporting means based upon the format data of the document;

memory means including a plurality of write regions corresponding to the information fields of the document, for writing the character/image data into the predetermined write regions, based upon the predetermined format data, and for reading the character/image data therefrom;

means for recognizing the character/image data read out from the write regions of the memory means; and, system control means for previously storing the format data of the document to be read, and for inspecting present writable regions within the image memory means from which the character/image data stored has been read out so as to permit the document to be intermittently transported by the document transporting means prior to the reading of the succeeding information field of the document.

Furthermore, these objects of the invention can be accomplished by providing a method of reading a document comprising steps of:

reading character and/or image information from predetermined information fields of the document in accordance with predetermined format data for the document to derive electronic character/image data;

storing the electronic character/image data into predetermined write regions of memory means corresponding to the information fields of the document;

reading out the electronic character/image data from the predetermined write regions of the memory means;

recognizing the electronic character/image data read out from the predetermined write regions of the memory means; and inspecting present writable regions within the memory means from which the electronic character/image data stored has been read out, thereby allowing the document to be intermittently read prior to the reading of the succeeding information field of the document.

BRIEF DESCRIPTION OF THE DRAWINGS

For a better understanding of these and other objects of the present invention, reference is made to the following detailed description of the invention to be read in conjunction with the following drawings, wherein:

FIGS. 9A and 9B show transfer pulses and sensor drive pulses;

FIG. 10 illustrates format data for the reading field of the document;

FIG. 11 illustrates format data of the character;

FIG. 16 shows control modes for the image memory shown in FIG. 5;

FIG. 17 shows a flowchart of the overall operations of the document reading apparatus shown in FIG. 5; and FIG. 18 shows a flowchart of the interrupt process employed in the overall operation process shown in FIG. 17.

DETAILED DESCRIPTION OF THE PREFERRED EMBODIMENTS

BASIC IDEA

Figure 1:
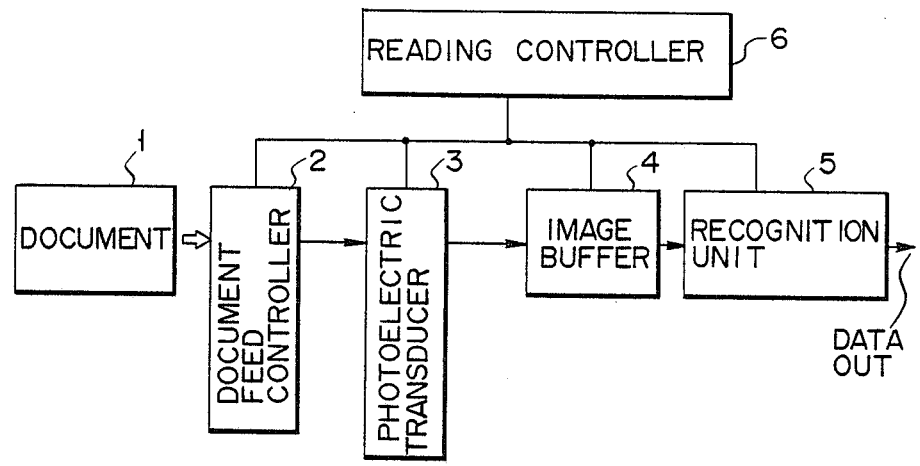
FIG. 1 is a schematic block diagram of a conventional document reading apparatus.
Figure 2:
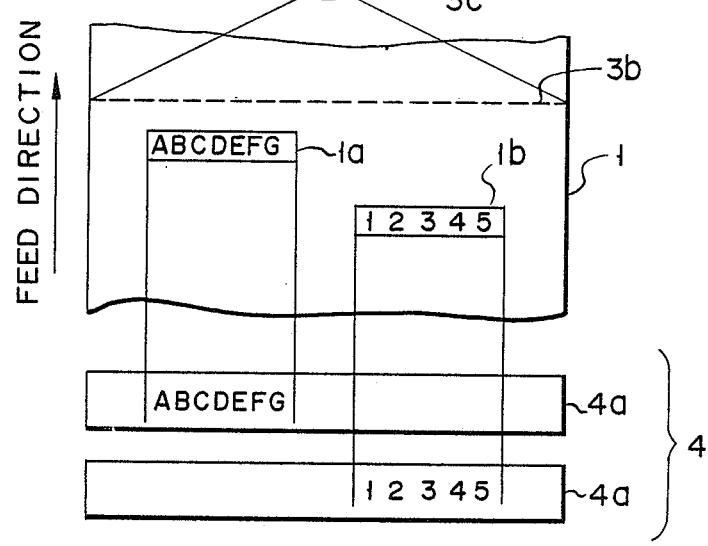
FIG. 2 is an illustration for explaining a relationship between the reading area of the document and the image memory of the reading apparatus shown in FIG. 1.
Figure 3:
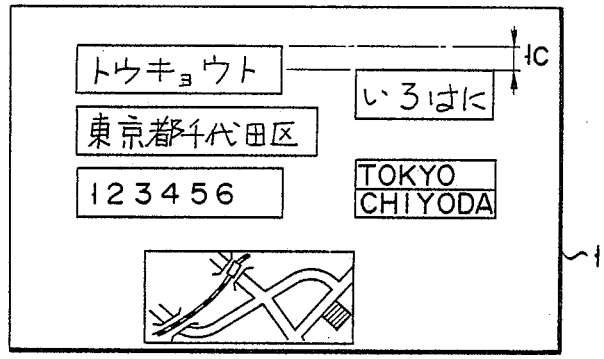
FIGS. 3 and 4 are document formats.
Figure 4:
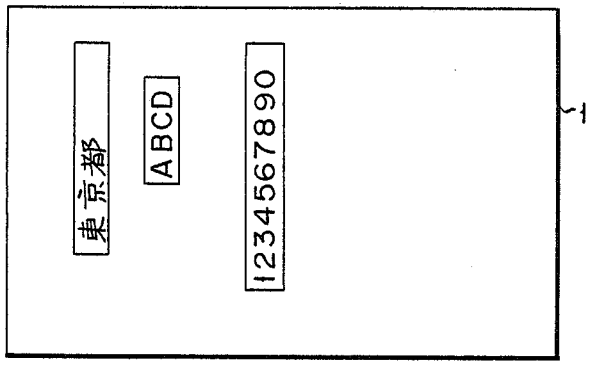

A basic idea of the document reading apparatus according to the invention will now be summarized.

The present invention is directed to a character and image reading apparatus for reading characters and images written on a document by scanning the document, storing the read character and image information into an image memory, and thereby performing the recognition and image processes, wherein the image memory having a memory capacity in excess of the total scanning region of the document is employed and the image memory operation is controlled in a scroll manner as will be explained hereinbelow.

This scroll control for the image memory may be understood by the following three functions:

(1) The document is selectively scanned in line by line in accordance with given format information. The character and image information is read out of the reading area on the document which is designated by the format information. Then, this character and image data is written into the writing unit area in the image memory which is preset in correspondence to the selective scanning of the document. Into the read character and image data stored into the writing unit area, area information regarding the reading area from which the information was obtained and also the attribute information concerned with the characters and images are respectively added, and thereafter this data is subjected to the recognition and image processes.

(2) The capacity (i.e., the number of the unit regions) of the writing unit area into which the character and image data has been written is subtracted from the whole capacity (i.e., the total number of the unit regions) of the image memory, thereby obtaining the capacity of the writable area (i.e., the number of the writable unit regions) in the image memory.

The definition of the "unit regions" in the specification should be understood as follows. In general, since a document contains various-sized readout fields, the corresponding unit regions of the image memory have different sizes, or capacities. It is however apparent that if a document contains the same-sized readout fields only, the corresponding unit regions of the image memory have the same sizes, or capacities.

On the other hand, the number of the writable unit regions is continuously updated while the recognition process is performed. That is to say, the capacity of the writing unit area from which the character and image data had already been read and recognized is added to the capacity of the writable region.

(3) When the succeeding readout region of the document is scanned, the capacity of the reading area on the document, designated by the above format information is compared with that of the updated, or latest writable area in the image memory prior to scanning this region, thereby selecting either the document scanning, or the temporary standby mode.

The features of the invention will be briefly summarized.

First, once the scanning operation of the reading region of the document commences, the scanning cannot be interrupted. Otherwise, problems may occur such as distortion of the image and mechanical damage of the document. Therefore, according to the invention, prior to commencement of reading the next readout field (region) on the document, the residual amount of the writable area in the image memory is checked. Depending upon the residual amount checked, the interruption of the document feed, or the document scanning is selectively performed.

Since the recognition operation of the read character and image data is simultaneously performed in accordance with the readout operation, the memory areas in which the character and image data has been stored so far becomes empty. Thus, these memory areas can be used as new writable memory areas. Namely, since the memory area can be always updated, the same effect achieved in the memory of a large capacity can be obtained even if the buffer memory of a relatively small capacity is used. Such a utilization of the memory areas is defined as a "scroll operation" of the memory in the invention.

Briefly stated, the document reading apparatus according to the invention is characterized in that at least one readout field or region exists in a document and the character and image information to be read is written in this field. Prior to reading the information in this field, the current writable capacity of the buffer memory is checked to determine whether the readout operation is executed, or brought into a standby condition. That is, the prior checking is made whether the character and image information can be completely stored in this latest writable memory regions.

According to the invention, in accordance with the reading areas or fields of the document which are designated by the format information or data, the writing unit areas to store the character and image data are allocated in the image memory and the respective character and image data is written into this allocated writing unit area. Therefore, it is possible to eliminate the limitations of the reading field at a fixed pitch which has been specified in the conventional apparatus. Thus, a document format having a high degree of freedom can be utilized.

In addition, the writable unit areas can be set in the image memory while continuously monitoring the writable area in the image memory. Therefore, a continuous damper function can be established for the scan of the document and also for the recognition processes of the character and image data. Even if the time necessary for the recognition processes of the character and image data greatly varies, this variation can be effectively absorbed and the document is efficiently scanned. In other words, a plurality of documents can be continuously fed during the document reading process at a substantially constant speed, even if these documents contain hand-written characters and/or images that take much recognition time, because the image memory can be operated under the scroll control and as a buffer or damper memory. According to the invention, since the document can be smoothly transferred during the reading process, the document convey unit can be of a simpler design and a low cost.

Not only the process to recognize the characters but also the function to read out the figures in an arbitrary area and the mark of an arbitrary format can be attained similarly to the foregoing effects.

ARRANGEMENT OF DOCUMENT READING APPARATUS

Figure 5:
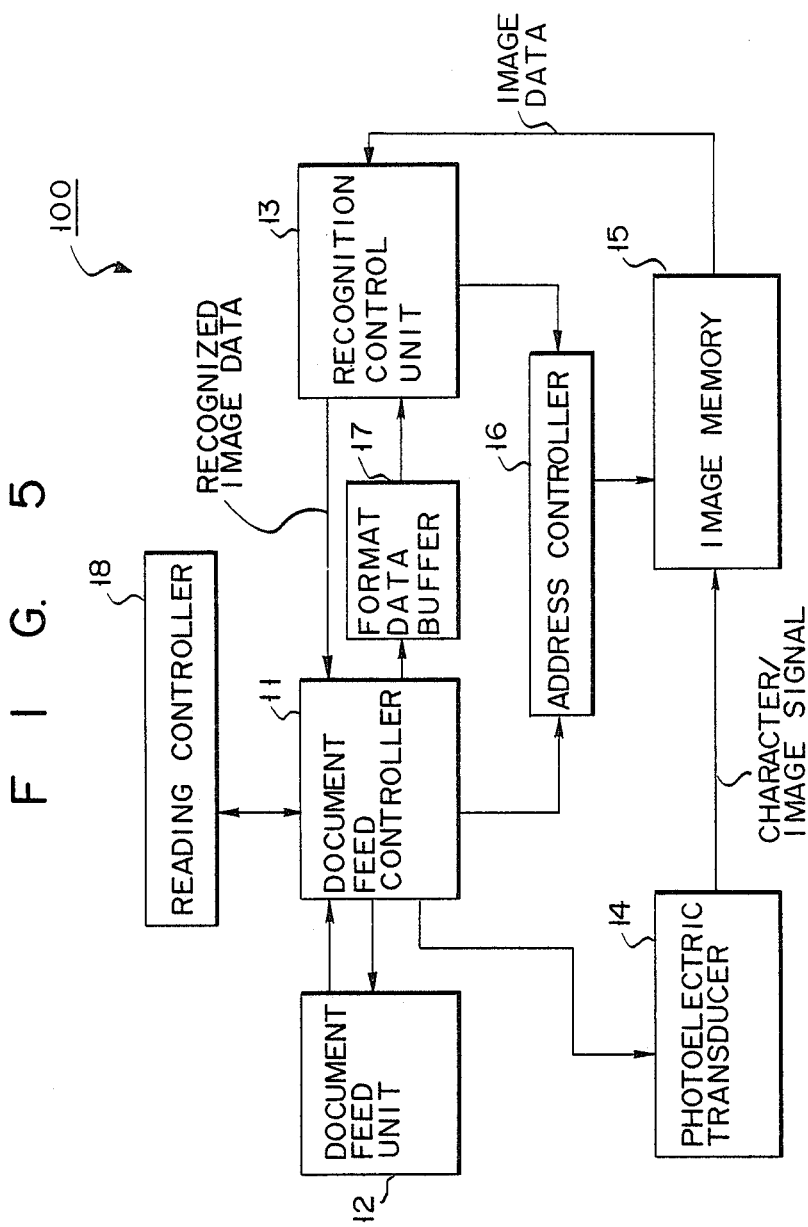
FIG. 5 is a schematic block diagram of a document reading apparatus according to one preferred embodiment.

Referring now to FIG. 5, a document reading apparatus 100 according to one preferred embodiment will be described. Document reading apparatus 100 mainly includes: a document feed controller 11, a document convey or feed unit 12; a recognition control unit 13; a photoelectric transducer 14; an image memory 15; an address controller 16; a format data buffer 17; and a reading controller 18 as a host computer.

The function of each unit will now be described. Document feed controller 11 controls the transportation of the document, delivers the recognized character and/or image data to the outside, receives the control data supplied from the outside devices (not shown) in detail, and so on. Document convey unit 12 practically controls the feeding of the document (shown in FIGS. 6A and 6B) and receives and outputs various statuses, or conditions in association with the document feed under control of document feed controller 11. Photoelectric transducer 14 photoelectrically converts the character image on the document into the electric signal, thereby reading and receiving the character image. The character image data which has been binary-digitized and derived from photoelectric transducer 14 is written into image memory 15. The character image data is written into image memory 15 under control of the write address by address controller 16 by the control of document feed controller 11.

Format data buffer 17 stores the format data, i.e., the information for indicating which read character and image data has been stored in the field, or region of the image memory 15. In general, a document has its own predetermined format, and thus, the formats may be varied in accordance with the sort of document. Recognition control unit 13 determines whether the readout field to be recognized exists in image memory 15 or not on the basis of the above-defined information stored in format data buffer 17. In addition, control unit 13 also determines into which region in image memory 15, the readout field was stored. Recognition control unit 13 in accordance with the format data reads the character image of the readout field to be recognized from image memory 15. The character image is then subjected to the processes for segmentation, discrimination, and the like of the characters. The recognized data is returned to document feed controller 11 on a reading field unit basis.

The above description is the fundamental processing function of each functional block.

DOCUMENT FORMAT/READING FIELD

Figure 6:
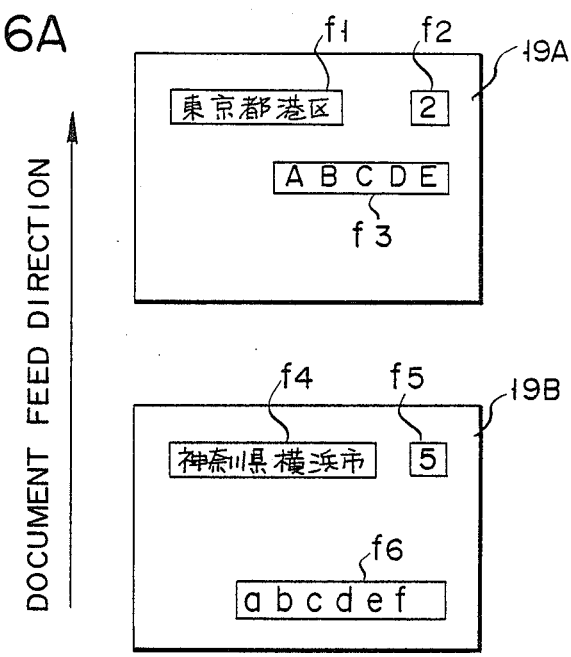
FIG. 6A shows two sheets of documents to be read.
FIG. 6B illustrates memory regions of the image memory.

FIG. 6A shows the character information, for example, KANJI information written on two sheets of documents 19A and 19B which are continuously conveyed. FIG. 6B shows the relationship between the unit for the reading field, or region and memory area in image memory 15 when the information is read out on a readout field unit basis of $f_1$ to $f_6$ and stored into image memory 15 (FIG. 5) in accordance with the feed sequence.

As shown in FIG. 6B, in document reading apparatus 100, the character and images written on documents 19A and 19B are sequentially read out and input in a manner such that, for example, the character line is read out and used as a unit of the readout field, or region. The read character and image data are sequentially written into the respective unit writing areas which are set, or allocated in the image memory 15 corresponding to the reading field unit of the document.

The reading operation of the character/image information from the documents and the writing operation of the read character/images data into image memory 15 will now be described in detail hereinbelow.

Figure 7:
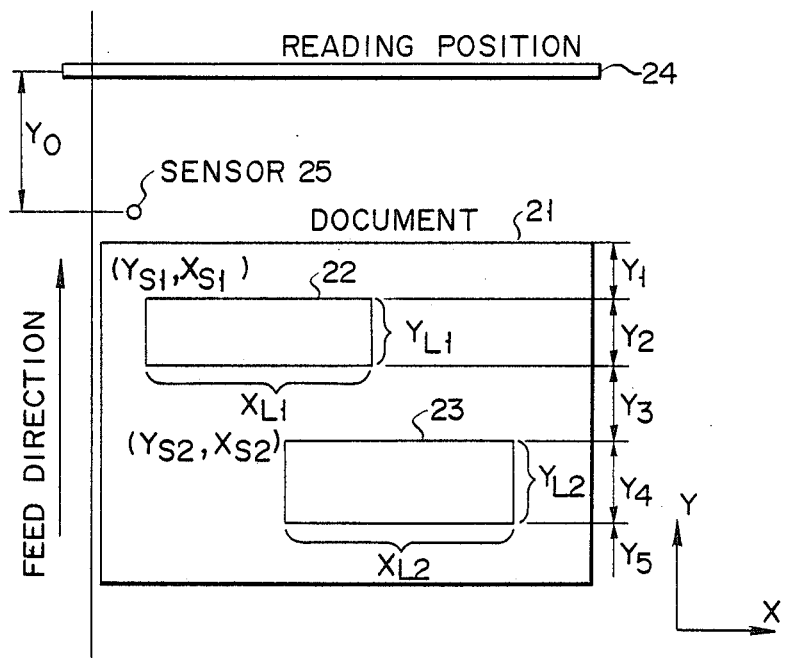
FIG. 7 is an illustration for explaining a relationship between the reading fields of the document.

FIG. 7 is a schematic diagram to clarify the positional relationship between a document 21 in document convey unit 12 shown in FIG. 5 and the principal functional device concerned with the recognition process. Document 21 is conveyed such that the upper and left sides are used as the base lines in the X and Y directions. Readout fields (character writing frames) 22 and 23 in document 21 are measured as the distances from each of the base lines, thereby performing a so-called "framing".

As previously described, readout fields 22 and 23 are measured before document 21 is read by document reading apparatus 100 or determined as a predetermined format in advance. The character subsets to be recognized, which are written in readout fields 22 and 23 and other format information are respectively given for each of readout fields 22 and 23.

READING OPERATION

Although not shown in FIG. 5, a plurality of documents 21 are input into the hopper unit and sent out to the convey path one by one with regular intervals by the convey take-out mechanism. In this case, the document is conveyed synchronously with a transfer timing signal which is given from document feed controller 11. Document 21 is fed to a reading position 24 of a photoelectric converting sensor under such document transportion control.

A sensor 25 arranged in front of reading position 24 at a distance $Y_0$ detects the edge of document 21 to be fed. The readout timings of the character and image information written in readout fields 22 and 23 of document 21 are controlled on the basis of the detection signal.

Figure 8:
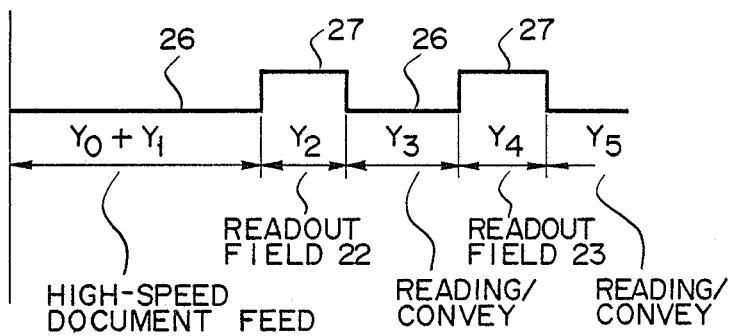
FIG. 8 illustrates the document convey and reading operations.

When a document detection signal is derived as shown in FIG. 8, the relationship of the distances between a non-readout field 26 and document 21 and between a readout field 27 and document 21 using reading position 24 as a reference position at that time can be known. Therefore, when document 21 is fed by only a distance of $(Y_0+Y_1)$ at a high speed after the document detection signal was obtained, if the reading operation by photoelectric transducer 14 is started, the information in readout field 22 can be read out. This reading operation from readout field 22 is executed over the period of time when document 21 is conveyed by only the distance $(Y_2)$. Subsequently, after document 21 was further fed by the distance $(Y_3)$, reading operation from readout field 23 is similarly started.

It should be noted here that when the reading operation has once been started, the writing operation into image memory 15 cannot be interrupted. Therefore, as will be explained hereinafter, the document reading apparatus is designed in such a manner that the reading and writing operations are performed after confirming that enough memory area, i.e., writable memory region into which the information of readout fields 22 and 23 can be fully written has previously been prepared, or is available.

READOUT TIMING CONTROL

FIG. 9 shows a reading control timing of document 21 as mentioned above. The document feed speed of non-readout field 26 shown in FIG. 8 is set to be twice as high as that of readout field 27, thereby realizing the high document feed speed. FIG. 9A shows a transfer timing signal for readout field 27. FIG. 9B shows a transfer timing signal for non-readout field 26. As shown in these timing charts, the periods of these transfer pulses are set to $\frac{1}{2}$. Thus, the period of a drive pulse for photoelectric transducer 14 is varied and this transducer is driven synchronously with the transportation of document 21.

FIG. 10 shows an example of the transfer control information regarding the example of document 21. This information, i.e., the format data is produced by document feed controller 11 (FIG. 5) on the basis of the information of readout fields 22 and 23 of document 21 which was input from an external apparatus (not shown in detail). In accordance with the format information, the transfer timings and the drive pulse of photoelectric transducer 14 are controlled, respectively.

In FIG. 10, (n) denotes a number representative of the sequence of the transfer unit. In this example, (0) to (5) are preset because two readout fields 22 and 23 are present on a sheet of document 21.

(EF) represents a flag indicative of the final transfer unit of document 21. In this case, the flag is set to the transfer unit of (n=5).

(RF) denotes whether the transfer unit is for read-out field 27 or for non-readout field 26. For example, "1" is set for the readout field and "0" is set for the non-readout field. Namely, flag (RF) designates the transfer mode.

(YS) is a value proportional to the distance from the base line (FIG. 7) in the Y direction regarding the readout field, as will be explained in detail hereinafter. The value, namely, the value of $Y_{s1}$ in readout field 22 is the same as the value of $Y_1$ mentioned before. The value of $Y_{s2}$ in readout field 23 is equal to $(Y_1+Y_2+Y_3)$.

(YL) indicates each transfer unit from the Y base line. The maximum transfer distance is specified by "FFF". The value YL is designated when the first of the documents is conveyed. The value YL is also designated at the end of transfer of the last readout field on the document. This process is performed to identify all of the coordinates by detecting the Y base line of document 21 irrespective of the size of document 21.

(XS) and (XL) denote a distance from the X base line (FIG. 7) of the readout field in document and a width of the readout field.

(FC) designates the subset of the character written in each of readout fields 22 and 23 to be read out, respectively. For example, as shown in FIG. 11, the FC consists of the eight-bit data and indicates the character subset on the basis of the information allocated to each bit position.

In the example of FIG. 11, the bit information is allocated in a manner such that (hand-written/type), (KANJI characters), (alphabets), (numerals), (KATAKANA characters), . . . , and the FC data is "10010000". Therefore, this data means that the character subset to be read out of the readout field is hand-written numerals.

In FIG. 10, the portions with oblique lines denote useless data as format information. Therefore, in the actual document reading apparatus, the data format is specified using flags EF and RF and the format information may be also handled as the information from which the useless data was removed.

CIRCUIT ARRANGEMENT OF DOCUMENT CONTROLLER

Figure 12:
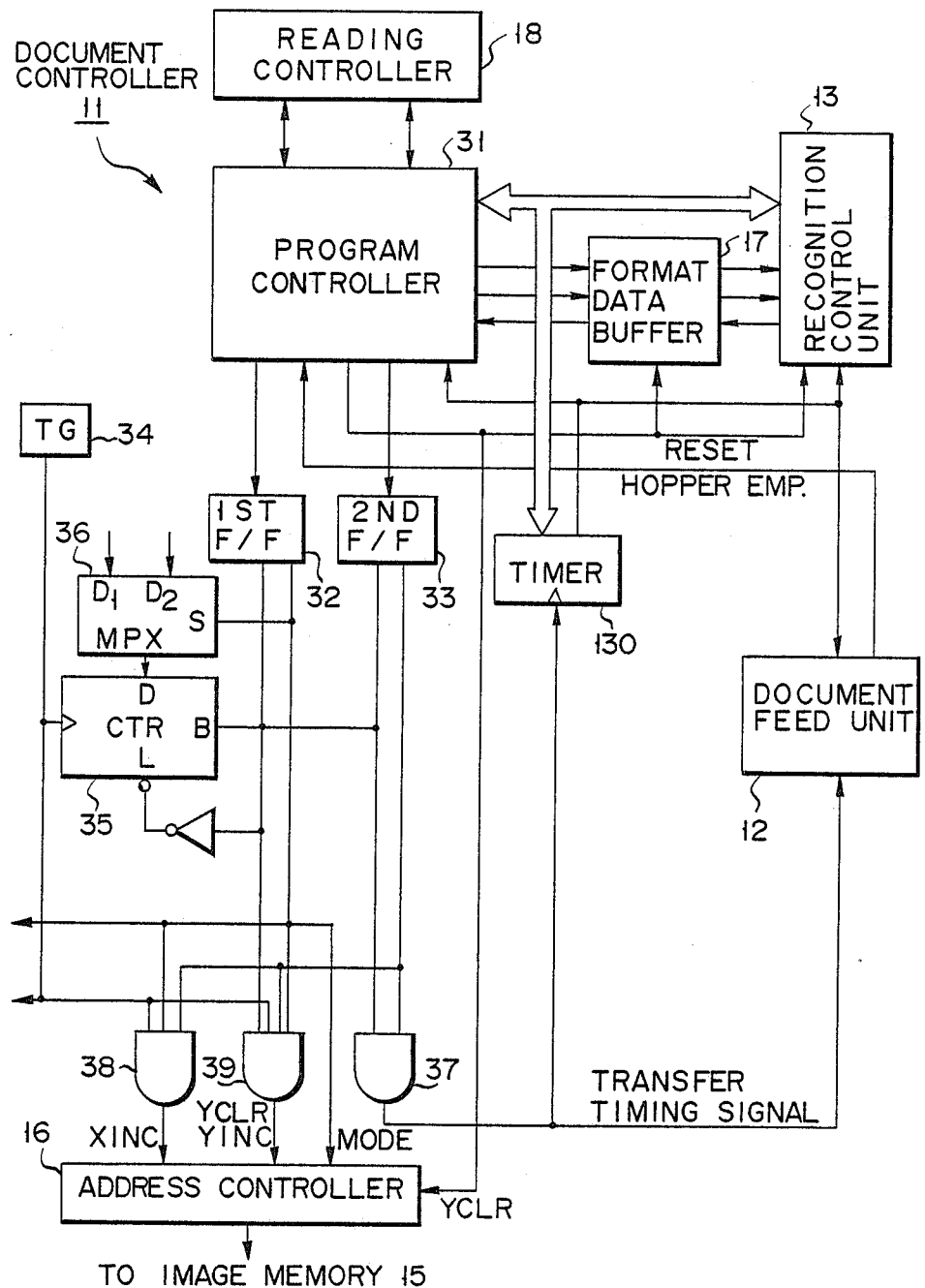
FIG. 12 is a schematic block diagram of the document controller shown in FIG. 5.

Referring to FIG. 12, a description will now be made of a circuit arrangement of document feed controller 11 shown in FIG. 5.

A program controller 31 receives the document format data (containing the data indicative of the readout field, data representative of the character subset to be recognized, and the like) from reading controller (host computer) 18 and operates in accordance with the control program stored in program controller 31. Program controller 31 enables the information to determine the reading or transfer mode to be set into a first flip-flop (1st F/F) 32 and also enables the information to instruct the stop of document feeding ("1" in the case of continuing the document transportation and "0" in the case of stopping the document transportation) to be set into a second flip-flop (2nd F/F) 33.

A timing generator (TG) 34 is provided to generate a drive clock pulse to drive photoelectric transducer 14 (FIG. 5). A counter (CTR) 35 receives the drive clock pulse and generates a transfer timing signal of document 21. Counter 35 is made operative or inoperative on the basis of the initialization data which is selectively input through a multiplexer (MPX) 36.

For example, when the line sensor (not shown in detail) of photoelectric transducer 14 is of the type consisting of 2048 bits (pixels), counter 35 may be realized by the 12-bit (2048 notation) counter. In the case of the reading and transporting, this counter initializes complement of two (2) "7FF" as the constant data and operates. When the non-readout field is scanned, as previously described in conjunction with FIG. 9B, the counter initializes the constant data "BFF" and operates to transfer document 21 at the double scanning speed.

The initial data is set into counter 35 by use of the carry output of counter 35. Multiplexer 36 selects the initial data on the basis of the output of first F/F 32.

By the operation of counter 35, the operation synchronization signals to photoelectric transducer 14 and document convey unit 12 are produced.

The output of second F/F 33 to interrupt the transportation of document 21 is input to an AND circuit 37 to AND-gate with the carry output of counter 35. The transfer timing signal to document convey unit 12 is produced by AND circuit 37.

Other AND circuits 38 and 39 operate in response to the outputs of first and second flip-flops 32 and 33, thereby obtaining address control signals (XINC, YINC) to control the write address of the image data into image memory 15. The address control signals are supplied to address controller 16.

The value of the address control signal regarding the Y component needs to be initialized to zero before a series of documents are continuously read out. For this purpose, the output of program controller 31 is given as YCLR to address controller 16.

OPERATION OF DOCUMENT CONTROLLER

The transportation of document 21, the synchronized control of the image sensor, and the control of the image memory are performed by document feed controller 11 arranged as described above. Thus, the document image data in each readout field on document 21 is continuously written into image memory 15 as shown in FIG. 6B such that the readout field is used as a unit.

According to the preferred embodiment, in order to sequentially write the document images of the readout fields into image memory 15, image memory 15 must be operated in a scrolling manner, since the total capacity (i.e., the total memory regions) of image memory 15 is relatively small. That is to say, recognition control unit 13 needs to be sequentially initialized to recognize the character and image data written in memory regions of the image memory 15 before reading the successive character and image written in the image memory. Further, the memory regions from which the character and image data have been subjected to the recognition processes need to be returned to the writable areas or memory regions in memory 15. Namely, the writable areas or memory regions denote the areas where the character and image data had already been read and recognized. Therefore, the information indicative of the existence of the writable storage areas of the image memory which have no data stored is the significant information necessary for reading and scanning the readout fields of document prior to executing the reading processes. This is because the reading of the character and image information written in the readout field cannot be interrupted.

The document reading apparatus is designed in a manner such that the readout fields to be written into image memory 15 are sequentially allocated from "0" of the Y address. Since the information of the readout fields is sequentially repeatedly written, even if the readout fields are the same, when the documents are different, the information of the readout fields is stored into the different addresses in image memory 15. Therefore, to initialize recognition control unit 13, the storage address of each readout field i.e., memory region in image memory 15 obviously needs to be specified.

Accordingly, with regard to a series of readout fields starting from the Y address "0", the addresses in image memory 15 can be informed to recognition control unit 13 by supervising the Y addresses by program controller 31.

Therefore, recognition control unit 13 receives the information of the area of the relevant readout field and of the reading character subset through format data buffer 17 in accordance with the supervisory information, executes the recognition process, reads out the recognized data and returns it to program controller 31 on a field unit basis. Thus, the next writable area is extended by only the width in the Y direction on the basis of the information of the relevant readout field.

FORMAT DATA PROCESSING

Figure 13:
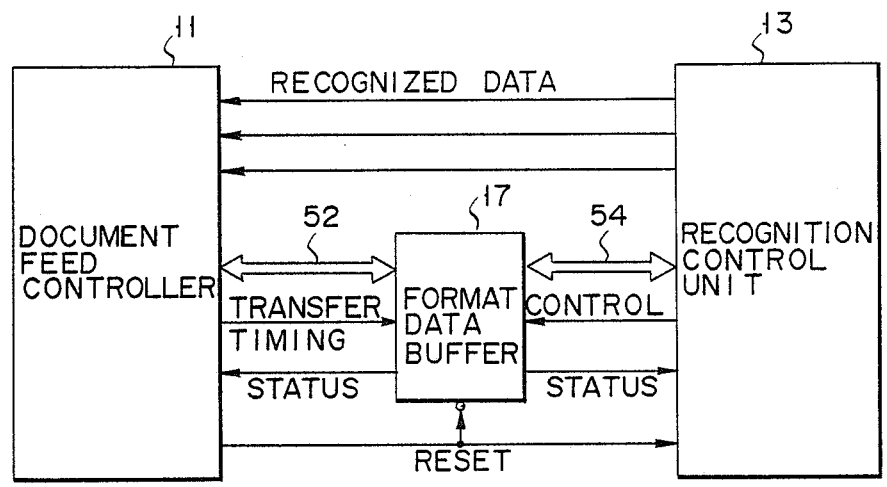
FIG. 13 illustrates the data transfer conditions between the document controller and the recognition control unit shown in FIG. 13.

FIG. 13 is a diagram for explaining conditions in which recognition control unit 13 receives the format data of the readout fields from document feed controller 11 through format data buffer 17.

Buffer 17 has what is called an FIFO (first-in first-out) function. After buffer 17 receives the reset signal from document feed controller 11 and is initialized, it starts to operate. When the scanning of one readout field in document 21 is completed by document feed controller 11, format data buffer 17 receives the format data of the relevant readout field as shown in, e.g., FIG. 14. In this case, the format data is received through a data bus 52 of eight (8) bits with respect to seven (7) bytes in response to the data transfer timing signal.

This data is written in accordance with the status signal which is output from format data buffer 17 until the capacity thereof is filled with the readout data.

On the other hand, the control information for the recognition process which has been written into format data buffer 17 is transferred to recognition control unit 13 through a data bus 54. The data in this case is transferred in the following manner. Namely, recognition control unit 13 detects the fact that format data buffer 17 has output the status signal indicative of the reception of the data. Recognition control unit 13 then outputs the transfer control signal to read out the format data, thereby performing the data transfer.

In this manner, recognition control unit 13 knows the coordinates of the readout field in the image memory and the information of flag FC on the basis of the format data obtained from document feed controller 11 and executes the character recognition process for the readout field.

The reading operation of the data from format data buffer 17 is performed on the basis of the unit of one readout field. After the data was fully read out, the writable capacity of the format data of the new readout field is increased by seven (7) bytes.

In this manner, the format data is given to recognition control unit 13. When recognition control unit 13 accomplishes the recognition process of the information (character images) of the readout field, an interruption signal is given to document feed controller 11 and the recognized data is output from recognition control unit 13 to document feed controller 11.

CIRCUIT ARRANGEMENT OF ADDRESS CONTROLLER

Figure 15:
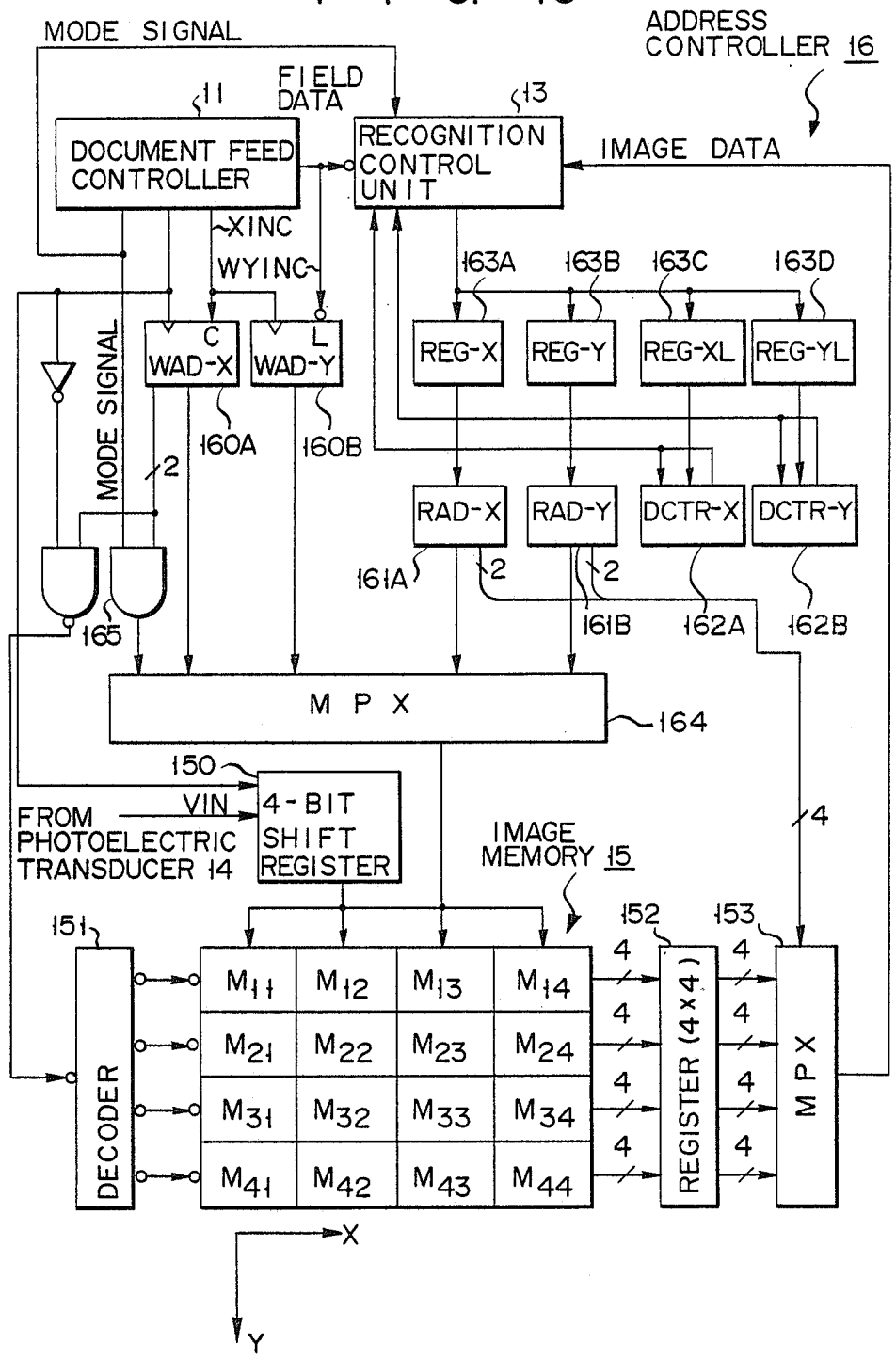
FIG. 15 is a schematic block diagram of the address controller shown in FIG. 5.

FIG. 15 shows a circuit arrangement of address controller 16 concerned with document feed controller 11 and recognition control unit 13 described above.

Address controller 16 to control image memory 15 is constituted by the following five main components. Namely, the first component is write address counters (WAD-X, WAD-Y) 160A and 160B having reset inputs of X and Y. The second component is read address counters (RAD-X, RAD-Y) 161A and 161B having data load inputs. The third component is data load counters (DCTR-X, DCTR-Y) 162A and 162B having data load inputs for respectively counting the lengths of readout fields in the X and Y directions. The fourth component is registers (REG-X, REG-Y, REG-XL, REG-YL) 163A to 163D for saving initial load data which is supplied from recognition control unit 13 to read address counters 161A and 161B and data load counters 162A and 162B, respectively. The fifth component is a multiplexer (MPX) 164 for selectively switching write address counters 160A and 160B and read address counters 161A and 161B in accordance with the writing and reading modes and for setting the outputs of the selected counters into the address data for image memory 15.

Address controller 16 operates in synchronism with a sync signal WXINC and a convey sync signal WYINC which are supplied from document feed controller 11 in synchronism with the image.

Counter 160A to count up sync signal WXINC and counter 160B to count up sync signal WYINC are respectively embodied as the eleven-bit counters based on the 2048 notation in this specification. Obviously, the WYINC signal is used as a clear signal of counter 160A, and the reset signal from document feed controller 11 is used as the reset signal to reset counter 160B.

The reset signal is output once for every document unit. Therefore, counter 160B cyclically operates on the basis of the 2048 notation by the WYINC signal.

WRITE/READOUT FROM IMAGE MEMORY

The reading operation of the information from image memory 15 by recognition control unit 13 is basically performed by raster-scanning the two-dimensional square region, i.e., a $4 \times 4$ matrix form in image memory 15. Practically speaking, the start address is obtained from registers 163A and 163B, the length of readout field in the X direction is derived from register 163C, and the length of readout field in the Y direction is obtained from register 163D, respectively, and the reading operation is performed. Each of those values is produced from the data which is transferred to recognition control unit 13 as the field data from document feed controller 11. The readout scanning of image memory 15 is executed on the basis of such field data and the character image stored into the memory region is recognized by recognition control unit 13.

Namely, read address counters 161A and 161B receive the start commands from recognition control unit 13 and obtain the initial data from registers 163A and 163B and start counting the fields in the X and Y directions, respectively. In this case, registers 162A and 162B derive the respective initial data from corresponding registers 163C and 163D.

The initialization values which are respectively loaded into registers 162A and 162B and which determine the width of the scanning region in image memory 15 are expressed by the complement of "2", respectively. The square region of image memory 15 is scanned on the basis of those initial data in response to the scan timing signal which is supplied from recognition control unit 13.

When image memory 15 is scanned in the X and Y directions, if the raster direction corresponds to the X direction, the carry signal from counter 162A is supplied as the status information to recognition control unit 13 and at the same time, the carry output is also supplied to register 163A to again load the data of register 163C, then the scan is completed. In the case of the raster scan in the Y direction, counter 162B operates in a manner similar to counter 162A.

In this manner, each time one raster line has completely been scanned, the count signal in the direction perpendicular to the raster line is sequentially output to write address counters 161A and 161B. When the carry signal (which is output from a terminal C) of counter 162B is output to recognition control unit 13, control unit 13 checks the status information and can know the completion of the scanning of the designated memory region of image memory 15.

As described above, both the data write address and data read address for image memory 15 are produced, respectively.

Multiplexer 164 in address controller 16 is provided to perform the writing and reading operations for image memory 15 in a time-sharing manner without interruption.

In the preferred embodiment, the memory areas of image memory 15 consisting of $2048 \times 2048$ pixels are divided into sixteen blocks of $4 \times 4$ in the X and Y directions. After image data VIN to be written into image memory 15 has once been stored into a shift register 150 of four bits, it is written into image memory 15 in parallel. Image data VIN is written in the following manner. Namely, lower two bits of the address data in the Y direction which is counted by write address counter 160B are input to a decoder 151, one column in the Y direction is selected, and image data VIN is simultaneously written into the selected four blocks in parallel.

On the contrary, in the case of reading out the data from image memory 15, the data in the divided sixteen image areas ($M_{11}$ to $M_{44}$) is respectively read out in parallel and saved into a register 152. The readout data which was saved in register 152 is selectively extracted through a data selector or multiplexer 153 by use of the data of lower two bits of each of the data set in read address counters 161A and 161B of address controller 16. The extracted data is further transferred to recognition control unit 13.

The address fluctuation in image memory 15 for the readout data can be reduced by the readout control according to the invention as described above.

In the preferred embodiment, the writing and reading operations for image memory 15 are controlled in a manner such that, as shown in FIG. 16, a write signal WE is output once for four periods of sync signal WXINC, and three periods among these four periods are allocated to the reading mode and the remaining one period is allocated to the writing mode.

Practically speaking, in FIG. 15, lower two bits of write address counter 160A and a mode signal which is supplied from document feed controller 11 are AND-gated by an AND gate 165. The selecting operation mode of multiplexer 164 may be switched by the output of AND gate 165. A signal to determine the selecting operation mode of multiplexer 164 is also output to recognition control unit 13 and used as control status information in the reading operation.

As described above, according to the invention, since image memory 15 is constituted by memory buffers, it is possible to realize the parallel operations in which the writing operation of the data is preferentially executed.

In this case, the information for indicating whether the readout field of the document 21 has been scanned or not is supplied as the mode signal from document feed controller 11. Therefore, when the non-readout field is transferred, it is apparent that all of the period of time for this transfer operation can be allocated to the readable period of time from image memory 15 by recognition control unit 13.

OVERALL CONTROL OPERATION

The function of each section of the document reading apparatus 100 and the example of the practical operation have been described above. The overall control of document reading apparatus 100 by document feed controller 11 will now be described with reference to FIGS. 17 and 18.

It is now assumed that the initial data such as document format has already been transferred from reading controller (host computer) 18 and processed.

In FIG. 17, the overall control is started by first initializing a write address YW in the Y direction of image memory 15, format data buffer 17, and recognition control unit 13 by the reset signals, respectively, (step 1). Then, an internal register "YS" (address in the Y direction in image memory of the readout field) which is controlled in accordance with the program, convey unit data "n" of the transfer control data, and control data "S" to stop the document feed are set to "0", respectively, and data "YS" indicative of the capacity in the Y direction of image memory 15 is set to "2048" (step 2).

After completion of those initialization steps, a check is first made to judge if the status of a hopper (not shown) is empty (HE=1) or not (step 3). If NO, with respect to the convey unit when (n=0), a check is made by RF (n) to judge if the field at the present time is the readout field or non-readout field (step 4).

When RF (n) is 0, the value of "FFF" of a timer 130 (FIG. 12) is loaded as YL (n) and at the same time, second flip-flop 33 to stop the document feed is set to "0" and first flip-flop 32 to determine the reading or transfer mode is set to "0" in order to set the high-speed transfer mode (step 5).

Thus, document 21 is fed out to the convey path from the hopper and transferred to the reading unit at a high speed. In this state, the document reading apparatus is in the standby mode in which all of the interruptions are enabled (step 6). At this time, timer 130 is counted down by the transfer timing signal. Just after the count value of timer 130 becomes "0", a borrow signal is output. The interruption is executed by the borrow signal.

The number of transfer clock pulses, after document 21 has been fed out of the hopper until the edge of document 21 is detected is a value which is somewhat smaller than "FFF" mentioned before, and the first document indicated by (n=0) is transferred. Therefore, the interruption signal to be detected first is the signal from document edge detection sensor 25 (FIG. 8) arranged on the convey path. This interruption is detected by the interruption processing program shown in FIG. 17 and flag "F" is set to "1". Then, the following processes are executed.

When it is detected that flag F is "1" (step 7), second flip-flop 33 is set to "1" to temporarily stop the transportation of the document and thereafter, the value of RF (n) is checked (step 9). If RF (n) is "0", namely, if non-readout field 26 is transferred, a check is made to judge if the convey unit is the final convey unit or not by checking whether the value of EF (n) is "1" or not (step 9). If the convey unit is not the final convey unit, convey unit sequence data "n" is incremented (step 10) and the next convey unit is read out. The processes similar to the above are repeated.

In this case, (n) is set to "1" since it is the time just after the edge of document is detected. The document is transferred at a high speed by only the distance of the value of YL (n), namely, the distance corresponding to $Y_0 + Y_1$ in FIG. 7 by timer 130 until the first readout field comes.

After completion of the above processes, when first readout field 22 of the document is transferred to the position of the sensor of photoelectric transducer 14, RF (n) becomes "1" at (n=2) and the transfer control routine of readout field 22 is executed. A check is made to judge whether a writable area exists or not with regard to the remaining memory capacity in the Y direction of image memory 15 (step 11). That is to say, the memory capacity YL (n), or writable area required for storing the data in the Y direction is sufficiently prepared in the remaining memory capacity of the image memory 15 in the Y direction.

Specifically, a check is made to see if the status $Y - YL (n) \geqq 0$ or not. If a writable area is lacking, the status $Y - YL (n)$ will be smaller than 0. In this processing step, the document reading apparatus waits for the interruption command from recognition control unit 13. The writable memory area of the image memory is increased by the interruption and scrolling operation. When the lack of writable memory area is eliminated, the following process (step 12) is executed.

In step 12, the value of YL (n) is loaded into timer 130, second flip-flop 33 is set to "0", and first flip-flop 32 is set to "1" to set the reading transfer mode. At the same time, the value or number of writable memory area Y in the image memory for the succeeding readout field is decreased by only the value of YL (n). After completion of the execution of the above processes, the present readout field is transferred and read out. The document reading apparatus waits for the interruption by the borrow signal from timer 130.

Flag F is set to "1" by the interruption from timer 130 (step 7) and the processing routine is returned to the foregoing processes. Second flip-flop 33 to stop the document feed is set to "1" and a check is made by the value of RF (n) to judge if the transfer region just before is the readout field or not (step 8).

In this case, since RF (n) is "1" when (n=3), document feed controller 11 transfers the format data of readout field 22 to recognition control unit 13. Namely, status FDWF indicating whether format data buffer 17 is in the writable condition or not is checked. If this status is "0", it is determined that buffer 17 is in the writable condition and edge address data Y in the Y direction in image memory 15 which has already been set and the format data when (n=3) are transferred in accordance with the format shown in FIG. 14 (step 13).

The status for recognition control unit 13 becomes "1" by this data transfer, so that recognition control unit 13 executes the necessary recognition processes.

By executing the recognition process, the recognized data of the readout field is derived. When the recognized data is transferred to document controller 11, controller 11 obtains the next write head address in the Y direction on the basis of YS+YL (n) and waits for the scan of the next readout field (step 14).

The above-mentioned processes are repeatedly executed while sequentially increasing readout field number n, thereby completing predetermined convey units.

In the process to increase field number n, if EF (n)=1 (step 9), namely, if the final convey unit is detected, n is initialized to "0" (step 15) and the next document (for example, 19B) is subjected to the transfer process.

In step 3, if it is determined that a document to be transferred doesn't exist in the hopper, second flip-flop 33 is set to "1" (step 16). Then, a check is made to see if recognition control unit 13 is busy or not (step 17). The end of the recognition process in recognition control unit 13 is detected and all of the processes are finished.

INTERRUPT PROCESS

Figure 14:
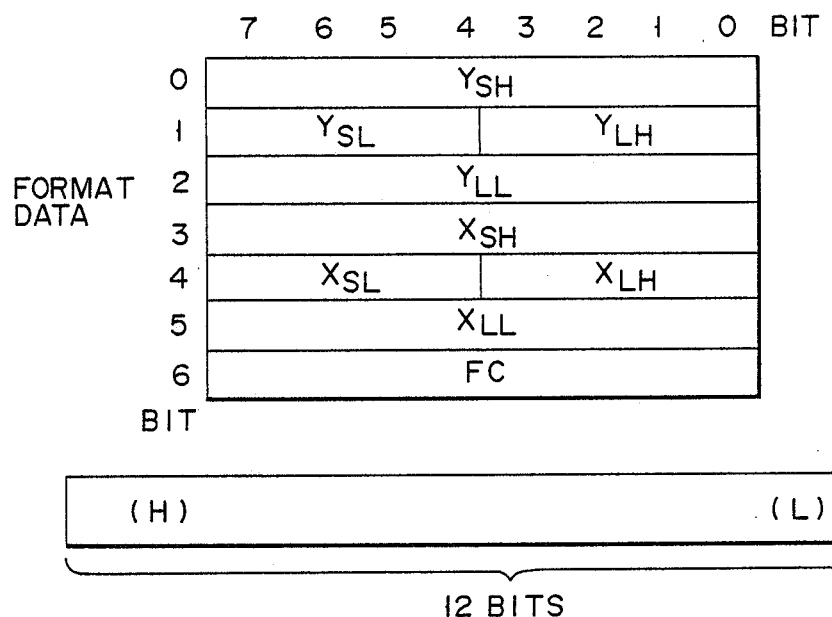
FIG. 14 illustrates the format data of the reading field of the document.

The interrupting process shown in FIG. 14 is started when the edge of document 21 is detected (step 20), when timer 130 is borrowed (step 21), and when the recognition process of the readout field by recognition control unit 13 is finished.

The interrupting process will now be described with reference to FIG. 18. First, a check is made to see if the interruption has been executed by the detection of the edge of the document (step 20) or by the borrow of timer 130 (step 21), respectively. If YES in steps 20 and 21, flag F is set to "1" and second flip-flop 33 is set to "1" (step 22) and the interrupting process is finished. Namely, after completion of the execution of the process in step 22, the processing routine is returned to the main processing routine which has previously been described in FIG. 17.

On the contrary, if NO in steps 20 and 21, it is determined that the interruption was executed by recognition control unit 13. In this case, the recognized data is read from recognition control unit 13 and information YL (n) indicative of the width in the Y direction in image memory 15 of the relevant readout field is read from format data buffer 17 (step 23).

Information YL (n) indicative of the width in the Y direction is added to the value of writable area Y in image memory 15 to further update the value of writable area Y, and flag F is set to "0" (step 24). After completion of the interrupting process, the processing routine is returned to the main processing routine previously described.

In execution of the interrupting process, the interrupting process which is executed by the detection of the edge of the document and by timer 130 disenables the interrupting process by recognition control unit 13. When the interrupting process is executed by recognition control unit 13, the enable state is held for the interruption by the detection of the document edge or by timer 130. Thus, the writing operation of the data into image memory 15 is preferentially executed.

ADVANTAGES

As described above, according to the present invention, the following advantages can be achieved.

First, it is apparent that even if the image memory areas stored are the same, the time necessary for the recognition process largely varies in dependence on the character subset to be read and the number of characters to be recognized with regard to the readout field. It is also well known that the recognition processing time varies considerably in dependence on the qualities of the hand-written characters. However, according to the invention, the document can be smoothly and constantly conveyed irrespective of those recognition time fluctuations, so that the document processing performance can be improved. Namely, the document can be smoothly transferred since the image memory 15 functions as a damper or buffer for the fluctuation in the recognition processing time.

In the case of continuously transferring a plurality of sheets of documents, on the other hand, a proper transfer interval between the successive documents is required for the page reader and the transfer time interval in this case becomes an idle time for the recognition process. However, according to the document reading apparatus of the invention, such a transfer time interval can be also allocated to the time required for the recognition process. Thus, the useless processing time can be eliminated, and therefore the transportation of the documents and the recognition process can be efficiently executed. Consequently, there is no need to introduce the complicated functions, such as parallel processes, pipeline processes and the like for the high-speed recognition process as in the conventional document reading apparatus, and the arrangement of the document reading apparatus can be simplified and the production costs can be reduced.

In addition, since it is possible to prepare the large image memory (memory capacity) on a document unit basis, not only characters can be recognized but also figures and graphic images containing a larger readout field can be processed. Therefore, the invention can cope with a variety of needs.

Further, various limitations for the readout fields in a document can be considerably eliminated and therefore the document written in a free format can be processed. Thus, the degree of freedom in design of the document can be effectively improved. The invention also has the advantage such that it can also cope with the skew of the document and the like.

Referring back to FIGS. 6A and 6B, the particular advantage of the invention will be summarized.

As seen from the image memory shown in FIG. 6B, the entire memory areas or regions thereof are limited to a given capacity. Accordingly, if this image memory is not operated under the scroll control according to the invention, a number of documents cannot be continuously fed during the document reading process. This is because the hand-written characters and/or images need much recognition time and thus the memory regions are filled with the preceding readout data. As a result, the transportation of the succeeding documents must be interrupted. However, according to the invention, the memory regions, i.e., writable memory regions can be continuously updated, so that continuous document transportion can be realized.

MODIFICATION

While the invention has been described in terms of certain preferred embodiments, those skilled in the art will readily appreciate that various modifications, changes, omissions, and substitutions may be made without departing from the spirit of the invention.

For example, the size (length) in the transfer direction of image memory 15 is required to be larger than at least that of the maximum readout field. However, this size may be arbitrarily determined in accordance with the specification of the document reading apparatus. The more, features desired, the larger the size of image memory 15 becomes in correspondence to the readout field.

Although the embodiment in which image memory 15 stores binary-level images has been described, image memory 15 may also apparently store multi-level images. Further, in generation of the address of the readout field in image memory 15, only the start point in the Y transfer direction fluctuates and none of YL, XS, XL, and FC changes. Therefore, when the format data is transferred to recognition control unit 13, YS and the control information which can clarify the relations with the other attribute information (YL, XS, XL, FC) may be also transferred. It is sufficient to respectively produce YL, XS, XL, and FC from this control information in recognition control unit 13. With this constitution, the amount of format data to be transferred can be reduced.

In addition, upon transfer of the format data to recognition control unit 13, the FIFO buffer was used in the foregoing embodiment. However, the data may be directly transferred to recognition control unit 13 based upon the program control and thus the FIFO may be also omitted.

What is claimed is:

1. A document reading apparatus comprising:
   means for transporting a document subdivided into a plurality of image pattern fields, each having at least one image pattern recorded thereon, in accordance with a predetermined format of the document;
   means for reading the image pattern from the image pattern fields of the document, to derive image information corresponding to the image pattern while the document is intermittently transported by the transporting means in accordance with the format of the document;
   memory means including a plurality of write regions corresponding to the image pattern fields of the document, for writing the image information into the predetermined write regions, based upon a predetermined document format data corresponding to the format of the document, and for reading image information therefrom, said memory means having a memory capacity which is capable of storing an amount larger than a maximum amount of the image information;
   means for recognizing the image information read out from the write regions of the memory means;
   system control means for storing, in advance, the document format data of the document to be read, and for driving the document transporting means to intermittently transport the document, prior to the reading of the succeeding one of the image pattern fields of the document, said system control means including means for updating the writable area while the image information is being recognized by said recognizing means, means for calculating an amount of writable regions of the memory means, on the basis of the whole memory capacity of the memory means and the write regions in which the image information has been written, and means for continuously monitoring present writable regions within the memory means, from which the image information stored has been read out; and
   means for driving the reading means to read the document when the calculating means calculates a predetermined amount of writable regions corresponding to an amount of the image information which corresponds to at least one of the pattern fields.

2. An apparatus as claimed in claim 1, wherein the system control means further previously stores attribute data representative of sorts of the image pattern recorded on the image pattern fields of the document.

3. An apparatus as claimed in claim 1, wherein the transporting means transports the document in a first direction and reading operation by the reading means is performed in a second direction perpendicular to the first direction.

4. An apparatus as claimed in claim 3, wherein the transporting means transports fields of the document other than the image pattern fields thereof at higher speed than in the image pattern fields.

5. An apparatus as claimed in claim 1, wherein the apparatus further comprises format data buffer means interposed between the recognition means and the system control means, the format data being derived from the format data buffer means in one unit of the image pattern fields of the document into the recognition means, thereby permitting the image information to be recognized in one unit of the image pattern fields of the document.

6. An apparatus as claimed in claim 1, wherein the reading means is a photoelectric line sensor having 2048 bits.

7. An apparatus as claimed in claim 1, wherein the memory means has $2,048 \times 2,048$-bit memory capacity, which is subdivided into 16 memory regions.

8. An apparatus as claimed in claim 1, wherein the image pattern fields of the document contain at least hand-written characters.

9. A method of reading a document, comprising the steps of:
   transporting a document having a plurality of image pattern fields, each having at least one image pattern recorded thereon, in accordance with a predetermined format of the document;
   reading the image pattern from the predetermined image pattern fields of the document, to derive image information corresponding to the image pattern while the document is intermittently transported in accordance with the format of the document;
   writing the image information into memory means having a memory capacity capable of the storing an amount larger than a maximum amount of the image information;

recognizing the image information read out from the memory means;

storing, in advance, (a) document format data corresponding to the format of the document to be read;

calculating an amount of writable regions of the memory means, on the basis of a whole memory capacity of the memory means and the write regions in which the image information has been written;

updating the writable area while the step of recognizing of the image information is being performed;

monitoring present writable regions within the memory means, wherefrom the image information was read out;

transporting intermittently the document prior to the reading of the succeeding one of the image pattern fields of the document; and reading the document in response to a predetermined amount of writable regions corresponding to an amount of the image information which corresponds to at least one of the image pattern fields.

10. A document reading apparatus comprising:

means for transporting a document having a plurality of image pattern fields, each having at least one image pattern including at least one of characters and picture recorded thereon, in accordance with a predetermined format for the document;

means for reading the image pattern from the image pattern fields of the document, to derive image information corresponding to the image pattern while the document is intermittently transported by the transporting means in accordance with the format of the document;

memory means for storing, in advance, format data corresponding to the format of the document;

memory means including a plurality of write regions corresponding to the image pattern fields of the document, for writing the image information into the predetermined write regions, in accordance with the format data, and for reading the image information therefrom, said memory emans having a memory capacity capable of storing an amount larger than a maximum amount of the image information;

means for recognizing the image information read out from the write regions of the memory means which stores the image information;

system control means including means for calculating an amount of writable regions of the memory means, on the basis of the whole memory capacity of the memory means and the write regions in which the image information has been written, means for updating the writable area while the image information is being recognized by said recognizing means, and means for monitoring present writable regions within the memory means which stores the image information, wherefrom the stored image information was read out; and means for driving the reading means for reading the document when the calculating means obtains a predetermined amount of writable regions corresponding to an amount of the image information which corresponds to at least one of the image pattern fields.

* * * * *

UNITED STATES PATENT AND TRADEMARK OFFICE
CERTIFICATE OF CORRECTION

PATENT NO. : 4,811,416
DATED : MAR 07, 1989
INVENTOR(S) : YOSHIKATHU NAKAMURA

It is certified that error appears in the above-identified patent and that said Letters Patent is hereby corrected as shown below:

On the title page, Item 30, please correct the following Priority Data:

--SEP. 27, 1985 [JP] Japan .................... 60-212546--

Signed and Sealed this

Twenty-first Day of November, 1989

Attest:

JEFFREY M. SAMUELS

*Attesting Officer*     *Acting Commissioner of Patents and Trademarks*